(12) United States Patent
Searle et al.

(10) Patent No.: US 7,600,737 B2
(45) Date of Patent: Oct. 13, 2009

(54) CUTBACK POPPET VALVE

(75) Inventors: Joseph M. Searle, Scottsdale, AZ (US); Donald J. Christensen, Phoenix, AZ (US); George T. Woessner, Phoenix, AZ (US); Jason A. Gratton, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 209 days.

(21) Appl. No.: 11/734,910

(22) Filed: Apr. 13, 2007

(65) Prior Publication Data
US 2008/0251144 A1 Oct. 16, 2008

(51) Int. Cl.
F16K 31/12 (2006.01)

(52) U.S. Cl. .................. 251/30.05; 251/30.02

(58) Field of Classification Search .............. 251/30.01, 251/30.02, 30.05
See application file for complete search history.

(56) References Cited

U.S. PATENT DOCUMENTS

| | | | | |
|---|---|---|---|---|
| 3,061,264 | A | * | 10/1962 | Rupert ................... 251/35 |
| 3,980,002 | A | * | 9/1976 | Jarman et al. ............ 91/461 |
| 4,015,616 | A | * | 4/1977 | Hanff ..................... 137/78.3 |
| 4,201,362 | A | * | 5/1980 | Nishimi et al. ............ 251/29 |
| 4,313,467 | A | | 2/1982 | Lang |
| 4,574,586 | A | * | 3/1986 | Gabrysch .................. 60/254 |
| 4,651,776 | A | | 3/1987 | Nakano et al. |
| 5,113,817 | A | | 5/1992 | Kemnitz et al. |
| 5,211,101 | A | | 5/1993 | Letsch et al. |
| 5,245,913 | A | | 9/1993 | Kato |
| 6,189,500 | B1 | | 2/2001 | Gyllenstedt |
| 6,227,247 | B1 | | 5/2001 | Abel |
| 6,895,991 | B2 | | 5/2005 | Woessner |
| 7,384,022 | B2 | * | 6/2008 | Gradwell ................. 251/324 |
| 2005/0051128 | A1 | | 3/2005 | Kim |

* cited by examiner

Primary Examiner—John K Fristoe, Jr.
(74) Attorney, Agent, or Firm—Ingrassia Fisher & Lorenz, P.C.

(57) ABSTRACT

A valve includes a valve body and a free floating poppet. The valve body includes an inlet, an outlet, and a fluid flow passage therebetween. The free floating poppet is disposed in the valve body, and is moveable between at least a closed position, in which the free floating poppet at least substantially restricts fluid from flowing through the fluid flow passage, and an open position, in which fluid is allowed to flow through the fluid flow passage. The free floating poppet includes a base section and a cutback section. The base section has a first cross sectional area. The cutback section has a second cross sectional area that is less than the first cross sectional area.

20 Claims, 3 Drawing Sheets

CUTBACK POPPET VALVE

STATEMENT REGARDING FEDERALLY SPONSORED RESEARCH OR DEVELOPMENT

This invention was made with Government support under contract number F08630-99-C-0027 awarded by the United States Air Force. The Government has certain rights in this invention

TECHNICAL FIELD

The present invention generally relates to a poppet valve, and more particularly relates to a poppet valve with an improved free floating poppet.

BACKGROUND

Valves are used to control the flow of gases or other fluids in various types of apparatus and vehicles, such as aircraft, rockets, and missiles. In certain situations, such as when valves are located in a vehicle propulsion or attitude control system, valves can be subject to hot gas effluent that reaches extremely high temperatures.

Valves that are exposed to such hot gas environments may include a free floating poppet that controls fluid flow through the valve. While such free floating poppet valves generally perform very well, successful operation of such valves may be dependent at least in part on maintaining low friction contact between the moving poppet and static valve components. There may be certain situations in which such a free floating poppet may experience thermal growth and/or a buildup of particulates after exposure to such hot gas environments, which in turn may cause unwanted friction and/or otherwise adversely affect valve performance.

Accordingly, there is a need for a free floating poppet valve that experiences reduced wear, buildup of particulates, and/or friction, and/or that experiences improved performance, in hot gas environments, and preferably without substantially increasing the weight and/or the costs of manufacturing the free floating poppet valve. The present invention addresses one or more of these needs.

BRIEF SUMMARY

An apparatus is provided for a valve. In one embodiment, and by way of example only, the valve comprises a valve body and a free floating poppet. The valve body includes an inlet, an outlet, and a fluid flow passage therebetween. The free floating poppet is disposed in the valve body, and is moveable between at least a closed position, in which the free floating poppet at least substantially restricts fluid from flowing through the fluid flow passage, and an open position, in which fluid is allowed to flow through the fluid flow passage. The free floating poppet includes a base section and a cutback section. The base section has a first cross sectional area. The cutback section has a second cross sectional area that is less than the first cross sectional area.

In another embodiment, and by way of example only, the valve comprises a valve body and a free floating poppet. The valve body has an inlet, an outlet, and a fluid flow passage therebetween. The free floating poppet is disposed in the valve body, and is moveable between at least a closed position, in which the free floating poppet at least substantially restricts fluid from flowing through the fluid flow passage, and an open position, in which fluid is allowed to flow through the fluid flow passage. The free floating poppet comprises a base section and a cutback section. The base section has a first cross sectional area. The cutback section has a second cross sectional area that is less than the first cross sectional area. A gap is defined at least in part between the cutback section and a least a portion of the fluid flow passage. A groove is defined at least in part between the cutback section and the base section.

In yet another embodiment, and by way of example only, the valve comprises a valve body and a free floating poppet. The valve body has an inlet, an outlet, and a fluid flow passage therebetween. The free floating poppet is disposed in the valve body, and is moveable therein between at least a closed position, in which the free floating poppet at least substantially restricts fluid from flowing through the fluid flow passage, and an open position, in which fluid is allowed to flow through the fluid flow passage. The free floating poppet comprise a base section and a cutback section. The base section comprises a first base section portion and a second base section portion. The first base section portion has a first cross sectional area. The second base section portion is connected to the first base section portion via a base connecting region, and has a second cross sectional area that is approximately equal to the first cross sectional area. The cutback section is connected to the first base section portion via a cutback connecting region, and has a third cross sectional area that is less than the first cross sectional area. A gap is formed in the free floating poppet between the cutback section and at least a portion of the fluid flow passage. A groove is formed in the free floating poppet between the cutback section and the base section.

BRIEF DESCRIPTION OF THE DRAWINGS

The present invention will hereinafter be described in conjunction with the following drawing figures, wherein like numerals denote like elements, and FIG. 1 provides a side view of an embodiment of a valve for use in hot gas applications, shown in a closed position.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
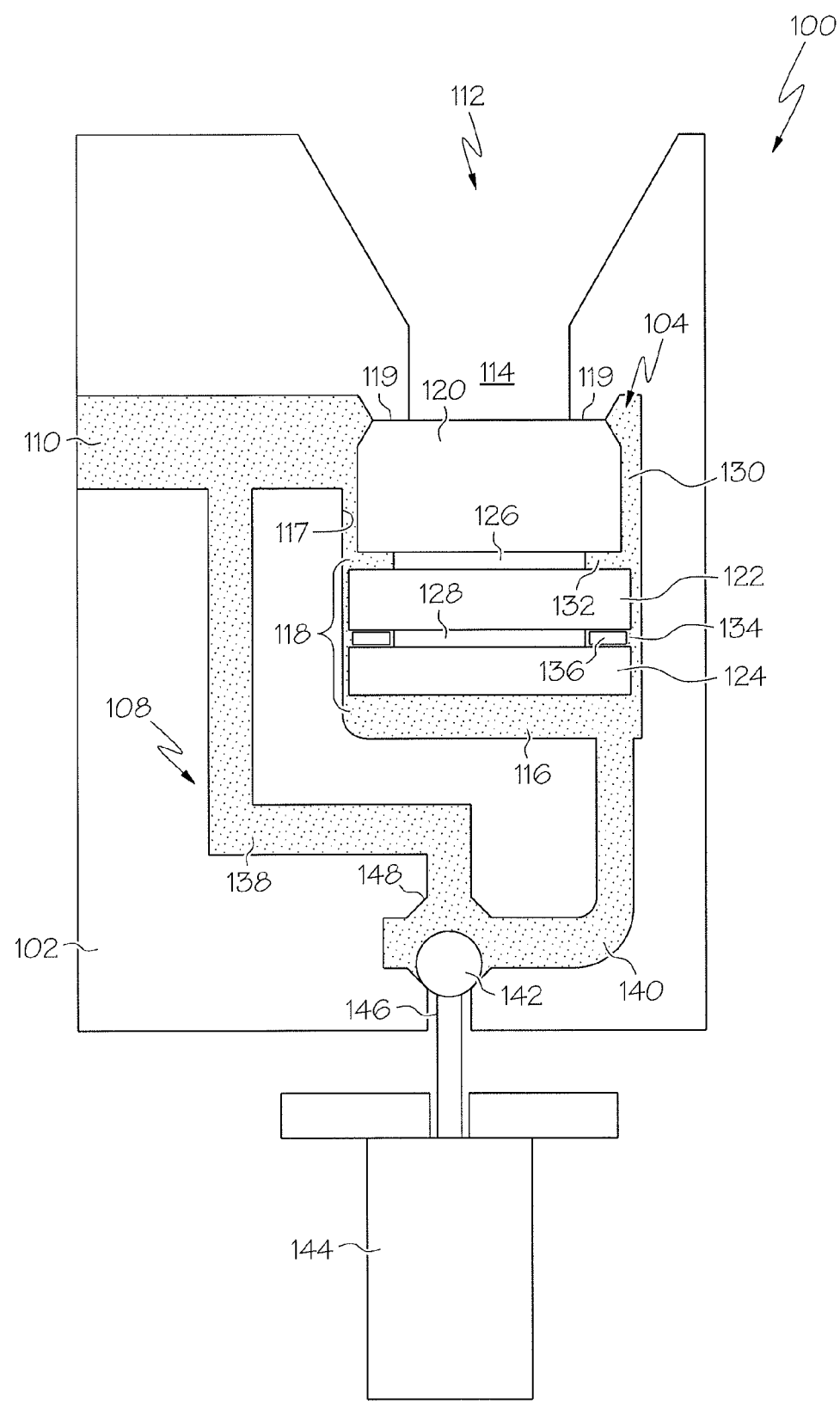
Figure 2:
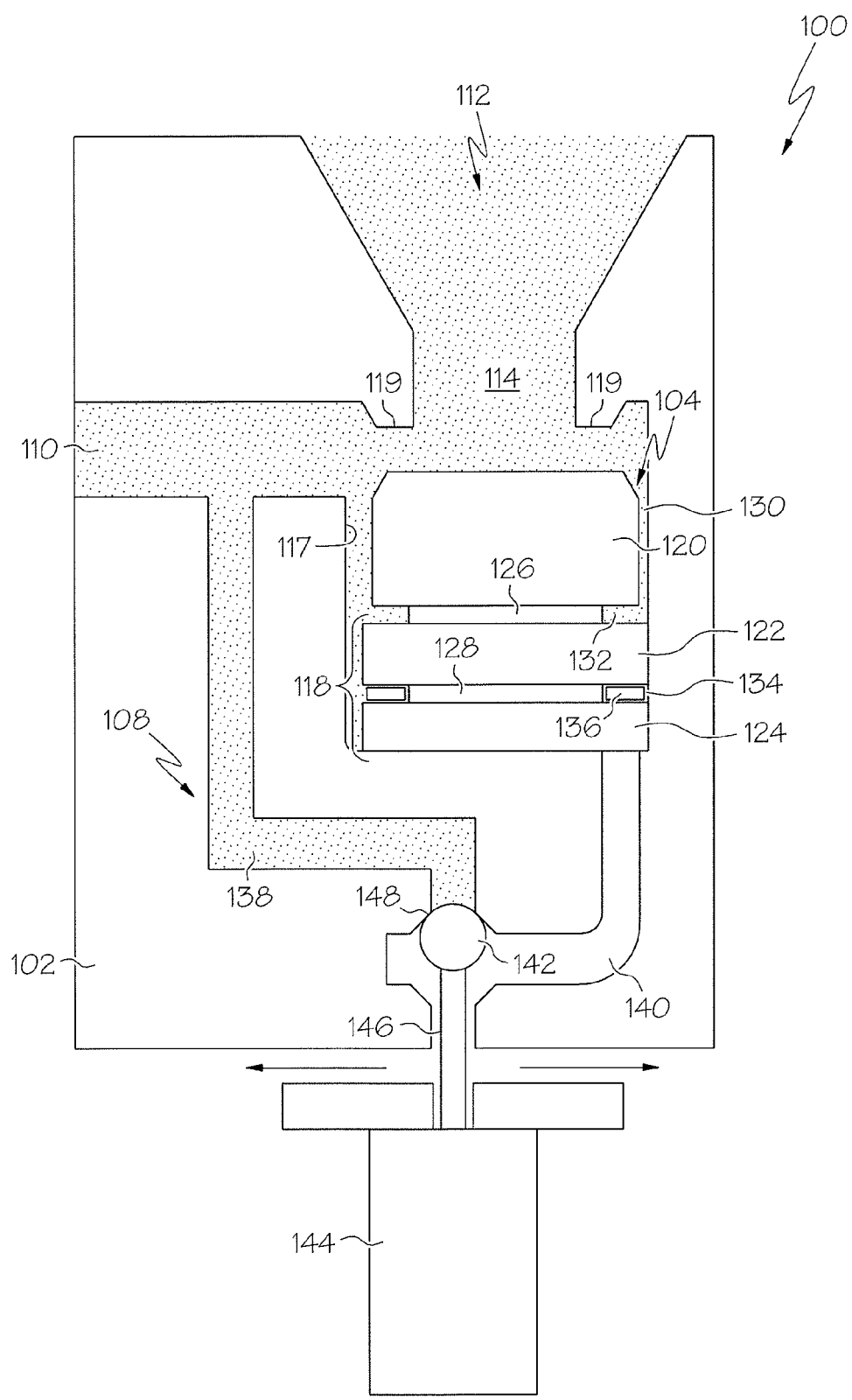
FIG. 2 provides a side view of the valve of FIG. 1, shown in an open position.

FIGS. 1 and 2 depict side views of an exemplary embodiment of a valve 100 for use in hot gas applications. The valve 100 includes a valve body 102, a poppet 104, and a position control system 108. The valve body 102 includes an inlet 110, an outlet 112, a fluid flow passage 114 therebetween, and a poppet chamber 116. In a preferred embodiment, the fluid flowing through the fluid flow passage 114, and other gas or fluid referenced herein, includes one or more hot gases. However, it will be appreciated that in certain embodiments other types of fluid may be used. The poppet chamber 116 is defined by an inner surface 117 of the valve body 102, and is in fluid communication with both the inlet 110 and the outlet 112.

The poppet 104 is disposed in the valve body 102, at least partially within the poppet chamber 116, and is movable between at least a closed position and an open position. When the poppet 104 is in the closed position, which is the position depicted in FIG. 1, the poppet 104 at least substantially restricts fluid from flowing through the fluid flow passage 114, for example by seating against a valve seat 119 formed in the valve body 102. Conversely, when the poppet 104 is in the open position, which is the position depicted in FIG. 2, fluid is allowed to flow through the fluid flow passage 114.

The poppet 104, which is preferably configured as a free floating poppet, includes a base section 118 and a cutback section 120. As will be described below in connection with FIG. 3, the cutback section 120 preferably has an outer diameter and a cross sectional area that is less than the outer diameter and the cross sectional area of the base section 118. This reduces possible friction from the poppet 104 that could otherwise result from build-up of particulates around, and/or thermal expansion of, the base section 118, and thereby improves performance of the valve 100. The cutback section 120 is preferably disposed closer to the inlet 110 than is the base section 118, so that the cutback section 120, rather than the base section 118, is exposed to the high temperatures and potential particulates from the hot gas environment.

In the depicted embodiment, the base section 118 includes a first base section portion 122 and a second base section portion 124, each having respective cross sectional areas that are approximately equal to one another, and that are greater than the cross sectional area of the cutback section 120. However, this may vary in other embodiments, for example in that the base section 118 may include only a single, unitary piece, and/or may include any number of portions of equal cross sectional areas.

The cutback section 120 and the first base section portion 122 are connected via a first connecting region 126, while the first and second base section portions 122, 124 are connected via a second connecting region 128. However, it will be appreciated that this may vary in certain embodiments. There may be any number of connecting regions for various portions of the base section 118. In addition, in certain embodiments there may not be any connecting regions, and/or the connecting regions may differ from those depicted in FIGS. 1 and 2.

A gap 130 is defined at least in part between the cutback section 120 and the inner surface 117. The gap 130 reduces potential undesirable effects from the exposure of the cutback section 120 to the hot gas environment. Specifically, the gap 130 provides increased radial clearance between the inner surface 117 and the poppet 104 to thereby allow for contaminant build up without creating friction or otherwise adversely affecting performance of the valve 100. Moreover, the gap 130 provides room for thermal growth of the cutback section 120 from the high temperatures of the hot gas environment, without contacting the inner surface 117, and without causing friction or otherwise adversely affecting performance of the valve 100.

In addition, a groove 132 is formed in the poppet 104 between the cutback section 120 and the first base section portion 122. Preferably, as depicted in FIGS. 1 and 2, the groove 132 is formed at a position on the poppet 104 such that it is disposed at least partially within the poppet chamber 116, and is also disposed between the first connecting region 126 and the inner surface 117. However, this may vary in other embodiments. The groove 132 also reduces potential undesirable effects of particle build up from the hot gas environment. Specifically, the groove 132 serves as a storage unit for housing particulates that might otherwise have resulted in unwanted contact or friction between the poppet 104 and the inner surface 117 or otherwise interfered with the operation of the poppet 104. The groove 132 can then be cleaned of particulates as necessary if and when the groove 132 becomes nearly full of such particulates. The poppet 104 may include any number of such grooves 132.

In the depicted embodiment, a recess 134 is formed in the poppet 104 between the first and second base section portions 122, 124. Preferably, and as depicted in FIGS. 1 and 2, the recess 134 is formed at a position on the poppet 104 such that it is disposed at least partially within the poppet chamber 116, and is also disposed between the second connecting region 128 and the inner surface 117. However, this may vary in other embodiments. A piston ring 136 is preferably disposed within the recess 134; however, this may also vary in other embodiments.

The depicted position control system 108 includes a first control conduit 138, a second control conduit 140, a control valve 142, and a valve actuator 144. The first control conduit 138 is coupled to the inlet 110, and is configured to receive fluid flow therefrom. The second control conduit 140 is coupled to the poppet chamber 116, and is further selectively coupled to atmospheric pressure or to the first control conduit 138, depending on the position of the control valve 142, as determined by the valve actuator 144. The control valve 142 is configured to move between a first position, in which it seats against a first control seat 146, and a second position, in which it seats against a second control seat 148, as described below.

The valve actuator 144 may be implemented using any one of numerous different types of devices or configurations, but in a preferred embodiment includes a solenoid. When the valve actuator 144 moves the control valve 142 to the first position, against the first control seat 146, as shown in FIG. 1, the control valve 142 allows fluid flow from the first control conduit 138 to the second control conduit 140. Accordingly, when the control valve 142 is in the first position, fluid supplied to the second control conduit 140 is directed against the poppet 104, overcoming pressure against the poppet 104 via the inlet 110, and thereby moving the poppet 104 to the closed position depicted in FIG. 1. Conversely, when the valve actuator 144 moves the control valve 142 to the second position, against the second seat 148, as shown in FIG. 2, the control valve 142 blocks fluid from flowing from the first control conduit 138 to the second control conduit 140, and the second control conduit 140 is vented to atmospheric pressure. Accordingly, when the control valve 142 is in the second position, the fluid flow from the inlet 110 moves the poppet 104 to the open position depicted in FIG. 2.

The depicted position control system 108 is merely exemplary in nature. It will be appreciated that the valve 100 can include any one or more of a number of different types of control systems and/or other devices for moving the poppet 104 between the closed position and the open position. In addition, before proceeding further, it is noted that each of the FIGS. 1 and 2 show certain preferred implementations of embodiments of the valve 100 and/or portions thereof, for example using certain valve concepts from U.S. Pat. Nos. 6,895,991 (Woessner) and 6,951,317 (Woessner et al.). However, it will be appreciated that various embodiments of the valve 100 and/or portions thereof can also be utilized in any number of different implementations.

Figure 3:
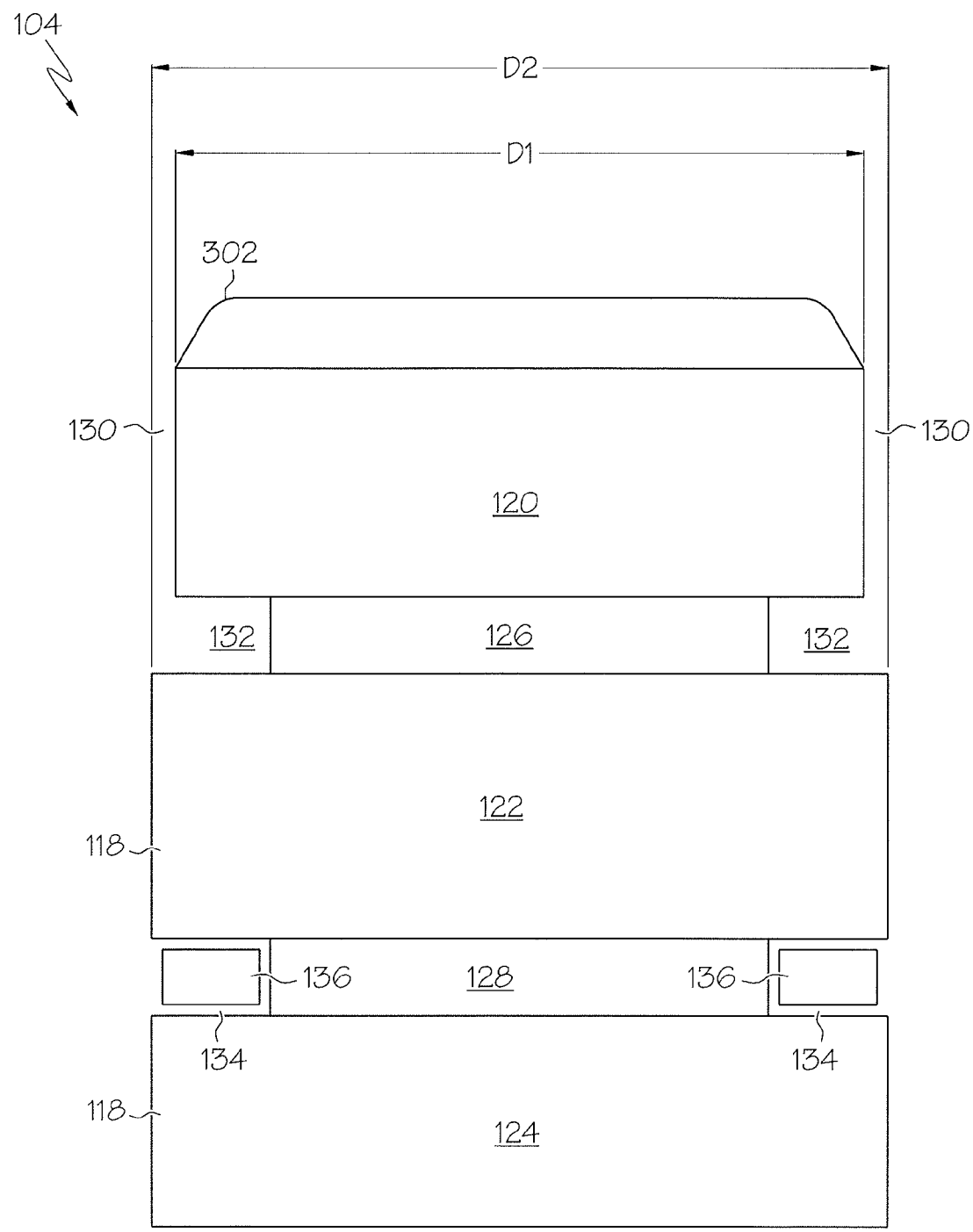
FIG. 3 provides a close-up view of a portion of an embodiment of the valve of FIG. 1, showing a poppet with a base portion and a cutback section.

FIG. 3 provides a close-up view of an exemplary embodiment of a poppet 104 that can be used in the valve 100 of FIGS. 1 and 2. As shown in FIG. 3, the cutback section 120 has an outer diameter of D1, while the first and second base section portions 122 and 124 each have a common outer diameter of D2, which is greater than D1. This outer diameter differential (D2−D1) results in the above-described gap 130, and allows the gap 130 to be in fluid communication with the above-described groove 132. Accordingly, as described above, this allows the cutback section 120 to thermally expand and for particulates in the hot gas to accumulate in the groove 132 and/or the gap 130, while reducing any unwanted contact among parts, friction, and/or other disruption in valve 100 operation. Preferably the cutback section 120 is sized to the diameter required for sealing (or at least substantially sealing) the fluid flow passage 114. In addition, preferably the cutback section 120 is long enough to include any areas exposed to gas flow, so that the cutback section 120 and not the base section 118 is directly exposed to the hot gas environment. For example, in one embodiment, the cutback section 120 may extend from a sealing end to the nearest piston ring or sealing surface. However, these and other preferred features may vary in other embodiments.

The poppet 104 can be tailored to the particular valve 100 in which it is to be used. For example, the difference in outer diameters between the base section 118 (D2) and the cutback section 120 (D1) can be tailored to the particular valve 100 based on factors such as the amount of particle accumulation and/or thermal growth anticipated for the cutback section 120 during operation of the valve 100. Accordingly, if the poppet 104 is configured to be placed in a particular type of valve 100 that is expected to result in relatively higher particle accumulation and/or thermal growth for the cutback section 120, then the difference in diameters (D2–D1) can be made relatively larger. Conversely, if the poppet 104 is configured to be placed in a particular type of valve 100 that is expected to result in relatively lower particle accumulation and/or thermal growth for the cutback section 120, then the difference in diameters (D2–D1) can be made relatively smaller.

The valve 100 and the poppet 104 described above are potentially beneficial, for example in reducing wear, buildup of particulates, and/or friction, and/or otherwise improving performance in hot gas environments. Moreover, this improved performance is attained without requiring the use of piston rings of increased width, or the use of heavier and more expensive materials, that could increase the loads on the rings and/or substantially increase manufacturing costs. The valve 100 and the poppet 104 can thus efficiently reduce friction and improve performance in hot gas environments.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A valve comprising:
    a valve body including an inlet, an outlet, and an inner surface defining a fluid flow passage between the inlet and the outlet;
    a free floating poppet disposed in the valve body and moveable between at least a closed position, in which the free floating poppet at least substantially restricts fluid from flowing through the fluid flow passage, and an open position, in which fluid is allowed to flow through the fluid flow passage, the free floating poppet including a base section and a cutback section, the base section having a first cross sectional area, and the cutback section having a second cross sectional area that is less than the first cross sectional area; the base section being a first distance from the inner surface to form a first diametrical clearance for the fluid flow passage, and the cutback section being a second distance from the inner surface, greater than the first distance, to form a second diametrical clearance for the fluid flow passage that is greater than the first diametrical clearance.

2. The valve of claim 1, wherein a gap is defined between the cutback section and the inner surface.

3. The valve of claim 2, wherein the gap allows for accumulation of foreign particulates therein and for thermal expansion of the cutback section.

4. The valve of claim 1, wherein a groove is formed in the free floating poppet between the cutback section and the base section.

5. The valve of claim 4, wherein the groove is configured to allow accumulation of foreign particulates therein.

6. The valve of claim 5, wherein the base section comprises:
    a first base section portion, connected to the cutback section via a first connecting region; and
    a second base section portion, connected to the first base section portion via a second connecting region.

7. The valve of claim 6, wherein a recess is formed in the free floating poppet between the first base section portion and the second base section portion.

8. The valve of claim 7, further comprising:
    a piston ring disposed in the recess.

9. The valve of claim 6, wherein the first base section portion and the second base section portion have approximately the same cross sectional area.

10. The valve of claim 1, wherein the free floating poppet is made at least in part from rhenium.

11. A valve comprising:
    a valve body having an inlet, an outlet, and an inner surface defining a fluid flow passage between the inlet and the outlet;
    a free floating poppet disposed in the valve body and moveable between at least a closed position, in which the free floating poppet at least substantially restricts fluid from flowing through the fluid flow passage, and an open position, in which fluid is allowed to flow through the fluid flow passage, the free floating poppet comprising:
        a base section having a first cross sectional area, the base section being a first distance from the inner surface to form a first diametrical clearance for the fluid flow passage; and
        a cutback section having a second cross sectional area that is less than the first cross sectional area, the cutback section being a second distance from the inner surface, greater than the first distance, to form a second diametrical clearance for the fluid flow passage that is greater than the first diametrical clearance;
    wherein:
        a gap is formed in the free floating poppet between the cutback section and the inner surface; and
        a groove is formed in the free floating poppet between the cutback section and the base section.

12. The valve of claim 11, wherein:
    the gap is configured to allow for thermal growth of the cutback section and for the accumulation of foreign particulars.

13. The valve of claim 11, wherein:
    the groove is configured to allow accumulation of foreign particulars therein.

14. The valve of claim 11, wherein the base section comprises:
 a first base section portion, connected to the cutback section via a first connecting region; and
 a second base section portion, connected to the first base section portion via a second connecting region.

15. The valve of claim 14, wherein the first and second base section portions have approximately the same cross sectional area.

16. The valve of claim 14, wherein a recess is defined at least in part between the first base section portion and the second base section portion.

17. The valve of claim 16, further comprising:
a piston ring disposed in the recess.

18. A valve comprising:
a valve body having an inlet, an outlet, and an inner surface defining a fluid flow passage between the inlet and the outlet;
a free floating poppet disposed in the valve body and moveable between at least a closed position, in which the free floating poppet at least substantially restricts fluid from flowing through the fluid flow passage, and an open position, in which fluid is allowed to flow through the fluid flow passage, the free floating poppet comprising:
 a base section comprising:
  a first base section portion, having a first cross sectional area, the first base section being a first distance from the inner surface to form a first diametrical clearance for the fluid flow passage; and
  a second base section portion, connected to the first base section portion via a base connecting region, and having a second cross sectional area that is approximately equal to the first cross sectional area, the second base section being a second distance from the inner surface to form a second diametrical clearance for the fluid flow passage; and
 a cutback section, connected to the first base portion via a cutback connecting region, and having a third cross sectional area that is less than the first cross sectional area, the cutback section being a third distance from the inner surface, greater than the first distance and the second distance, to form a third diametrical clearance for the fluid flow passage that is greater than the first diametrical clearance and the second diametrical clearance;
wherein:
 a gap is formed in the free floating poppet between the cutback section and the inner surface; and
 a groove is formed in the free floating poppet between the cutback section and the base section.

19. The valve of claim 18, wherein a recess is defined at least in part between the first base section portion and the second base section portion.

20. The valve of claim 19, further comprising:
a piston ring disposed in the recess.

\* \* \* \* \*